US010602094B1

(12) United States Patent
Longo et al.

(10) Patent No.: US 10,602,094 B1
(45) Date of Patent: Mar. 24, 2020

(54) ENTITLEMENT ACCESS TOKEN

(71) Applicant: Amazon Technologies, Inc., Seattle, WA (US)

(72) Inventors: Chris Longo, Seattle, WA (US); Qianghua Lu, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/188,847

(22) Filed: Jun. 21, 2016

(51) Int. Cl.

| | |
|---|---|
| ***H04N 7/16*** | (2011.01) |
| ***H04N 7/167*** | (2011.01) |
| ***G06F 21/10*** | (2013.01) |
| ***H04L 9/32*** | (2006.01) |
| ***H04N 21/266*** | (2011.01) |
| ***H04N 21/4627*** | (2011.01) |
| ***H04N 7/173*** | (2011.01) |
| ***H04N 21/41*** | (2011.01) |

(52) U.S. Cl.
CPC .......... *H04N 7/1675* (2013.01); *G06F 21/10* (2013.01); *H04L 9/3213* (2013.01); *H04N 7/165* (2013.01); *H04N 7/17318* (2013.01); *H04N 21/26606* (2013.01); *H04N 21/4108* (2013.01); *H04N 21/4627* (2013.01); *G06F 2221/2141* (2013.01); *H04L 9/32* (2013.01)

(58) Field of Classification Search
CPC .......... H04N 21/266; H04N 21/26606; H04N 21/4623
See application file for complete search history.

(56) References Cited

U.S. PATENT DOCUMENTS

| | | | | |
|---|---|---|---|---|
| 9,641,880 B1 * | 5/2017 | Scurtu | H04N 21/254 | |
| 2007/0260604 A1 * | 11/2007 | Haeuser | H04L 63/10 | |
| 2009/0041242 A1 * | 2/2009 | Yang | G06F 21/10 | 380/255 |
| 2012/0066494 A1 * | 3/2012 | Lee | G06F 21/10 | 713/160 |
| 2012/0324552 A1 * | 12/2012 | Padala | G06F 21/10 | 726/6 |
| 2013/0139241 A1 * | 5/2013 | Leeder | H04W 12/06 | 726/9 |
| 2013/0283033 A1 * | 10/2013 | Ahuja | H04L 9/3213 | 713/150 |
| 2016/0171187 A1 * | 6/2016 | Durbha | G06F 21/10 | 726/29 |
| 2017/0054726 A1 * | 2/2017 | Friedmann | H04L 63/10 | |

* cited by examiner

*Primary Examiner* — Kyu Chae
(74) *Attorney, Agent, or Firm* — Lowenstein Sandler LLP

(57) ABSTRACT

A top-level service executes a procedure call to at least one dependent service to determine an entitlement result for a user device making a request of the top-level service. A processing device generates an entitlement token comprising the entitlement result, encrypts the entitlement token and sends the entitlement token to the user device. The user device can return the entitlement token when making additional requests of the top-level service to prevent the top-level service from having to make additional procedure calls to the at least one dependent service.

15 Claims, 7 Drawing Sheets

ENTITLEMENT ACCESS TOKEN

BACKGROUND

Many users consume media on a plurality of devices, such as, for example, personal computers and handheld devices. For example, the media may include television shows, movies, music, pictures, and/or any other type of media. A plurality of sources may transmit the media and a user may consume the received media by purchasing the media, renting the media, watching the media, playing the media, or in any other manner.

BRIEF DESCRIPTION OF THE DRAWINGS

Embodiments of the present disclosure will be understood more fully from the detailed description given below and from the accompanying drawings, which, however, should not be taken to limit the present invention to the specific embodiments, but are for explanation and understanding only.

DETAILED DESCRIPTION

Embodiments are described for use of an entitlement access token to reduce latency associated with executing procedure calls to lower-level, dependent services. In one embodiment, a top-level service, such as a video on-demand (VOD) service, may be designed to receive requests from various user devices, process those requests, and perform requested actions. For example, the top-level service may receive a request to browse or initiate playback of certain media titles on the user device. Upon receiving the request, the top-level service may verify that the user device is authorized or entitled to make such a request, and if entitled, may initiate playback, or perform some other action as requested. In one embodiment, to verify entitlement, the top-level service may execute one or more procedure calls to various lower-level, dependent services. For example, there may be designated playback authority services or entitlement services that can perform all or a portion of the entitlement determinations. Executing the procedure calls to each of these dependent services, waiting for processing to occur, and receiving the response takes some non-trivial amount of time, thereby delaying performance of the requested action.

In one embodiment, the top-level service can use an entitlement token to reduce the latencies associated with executing procedure calls to these dependent services. Upon receiving a first request from a user device and determining entitlement to make the request by executing the procedure calls to the dependent services, the top-level service may take the entitlement result, which indicates whether the requesting user device is authorized to access a given media title, and stores the entitlement result in an entitlement token. Then entitlement token can be encrypted and sent to the user device for future use. When the user device makes a subsequent request of the top-level service, the user device sends the entitlement token along with the request. The top-level service can validate the token to determine whether the user device is authorized to make the associated request. In this manner, the top-level service can verify the entitlement of the user device without having to make the same procedure calls to the dependent entitlement services which were previously executed. As a result, a total time for processing the request (e.g., a time to first frame (TTFF)) can be significantly reduced.

Figure 1:
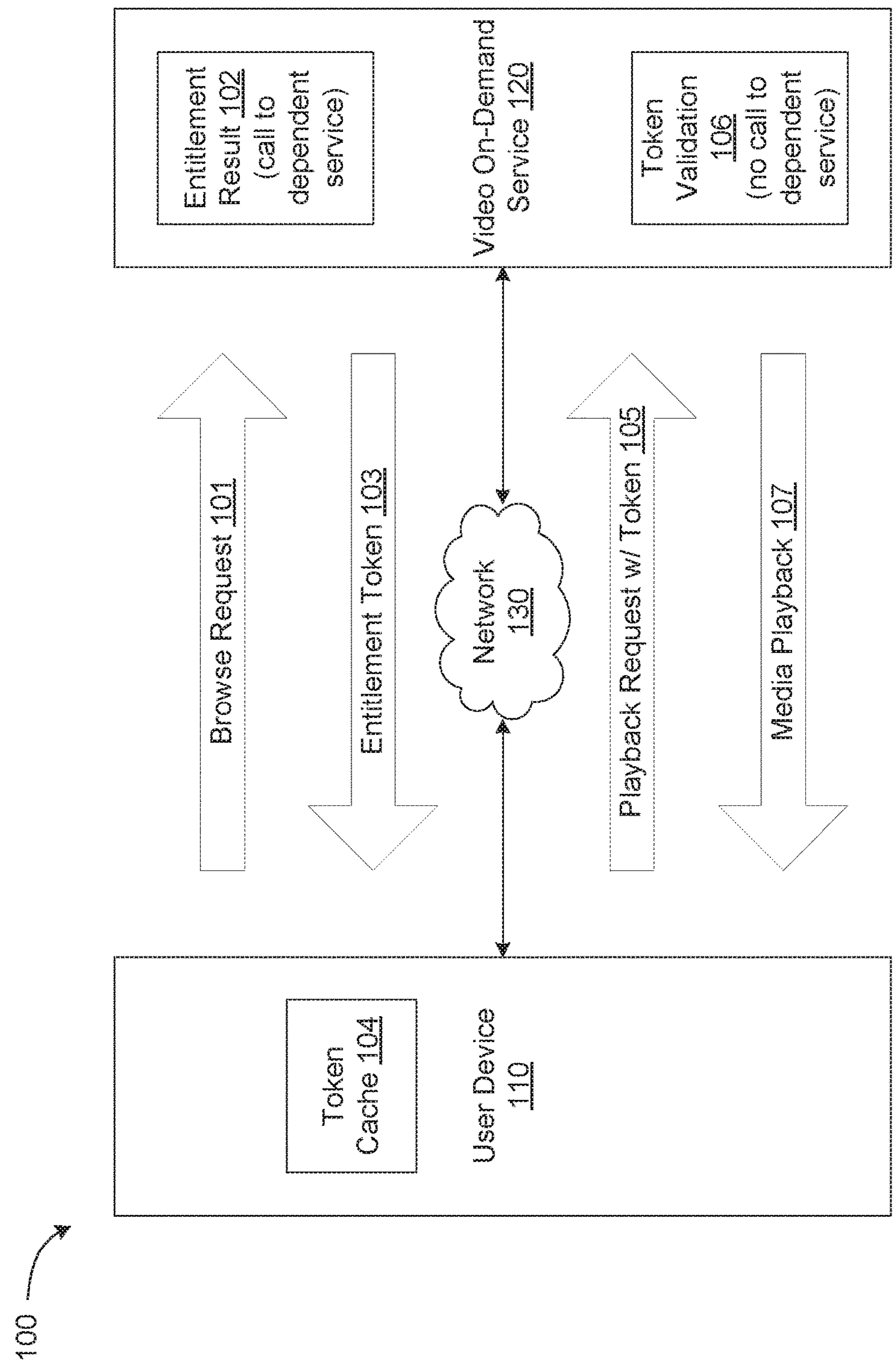
FIG. 1 is a diagram illustrating use of an entitlement access token, according to an embodiment.

FIG. 1 is a diagram illustrating the use of an entitlement access token, according to an embodiment. In one embodiment, system 100 includes a user device 110 configured to access a VOD service 120 over network 130. In one embodiment, VOD service 120 allows various user devices, such as user device 110, to select and view (i.e., playback) various video titles offered by VOD service 120. The video titles may be streamed for viewing in real time, or may be downloaded for viewing at any later time. In another embodiment, the service 120 may provide some other type of media (e.g., audio) to requesting user devices. In other embodiments, the service 120 may perform some other operations besides providing media content.

In one embodiment, user device 110 may make a browse request 101 of VOD service 120. The browse request 101 may be a request to view media titles available for playback on user device 110. In one embodiment, the browse request 101 may include identification information associated with user device 110, such as a type of the user device, a type of account associated with the user device, a location of the user device, a playback history of the user device, etc. In response to receiving browse request 101, VOD service 120 may determine an entitlement result 102 indicating a plurality of media titles which user device 110 is entitled to request for playback. For example, the entitlement result may indicate whether the play button for a given media title should be highlighted (thus allowing selection by a user of user device 110) or grayed out (thereby preventing selection by the user). In one embodiment, VOD service 120 may execute a procedure call to at least one dependent service (e.g., an entitlement service) which may compare the received identification information to stored entitlement information and/or policy data to generate entitlement result 102. Upon determining entitlement result 102, VOD service 120 may generate an encrypted entitlement token and send the entitlement token 103 to user device 110. User device 110 may store the received entitlement token in a token cache 104 for use with future requests made of VOD service 120.

In one embodiment, after browsing available media titles, user device 110 may make a second playback request 105 for a certain media title offered by VOD service 120. In one embodiment, the playback request 105 may include the entitlement token stored by user device 110 in token cache 104. VOD service 120 may receive the playback request 105 and attached token and may perform a token validation. In one embodiment, VOD service 120 may decrypt the entitlement token, verify that a time-to-live value associated with the token has not expired, and validate 106 that the contents of the token indicate that the user device 110 is entitled to initiate playback of the requested media title. In this manner, VOD service 120 can verify the entitlement of user device 110 without having to make the same procedure calls to the dependent entitlement services which were previously executed to generate entitlement result 102. VOD service 120 can then initiate playback 107 of the requested media title on user device 110. As a result, a latency period associated with processing the playback request 105 is reduced.

Figure 2:
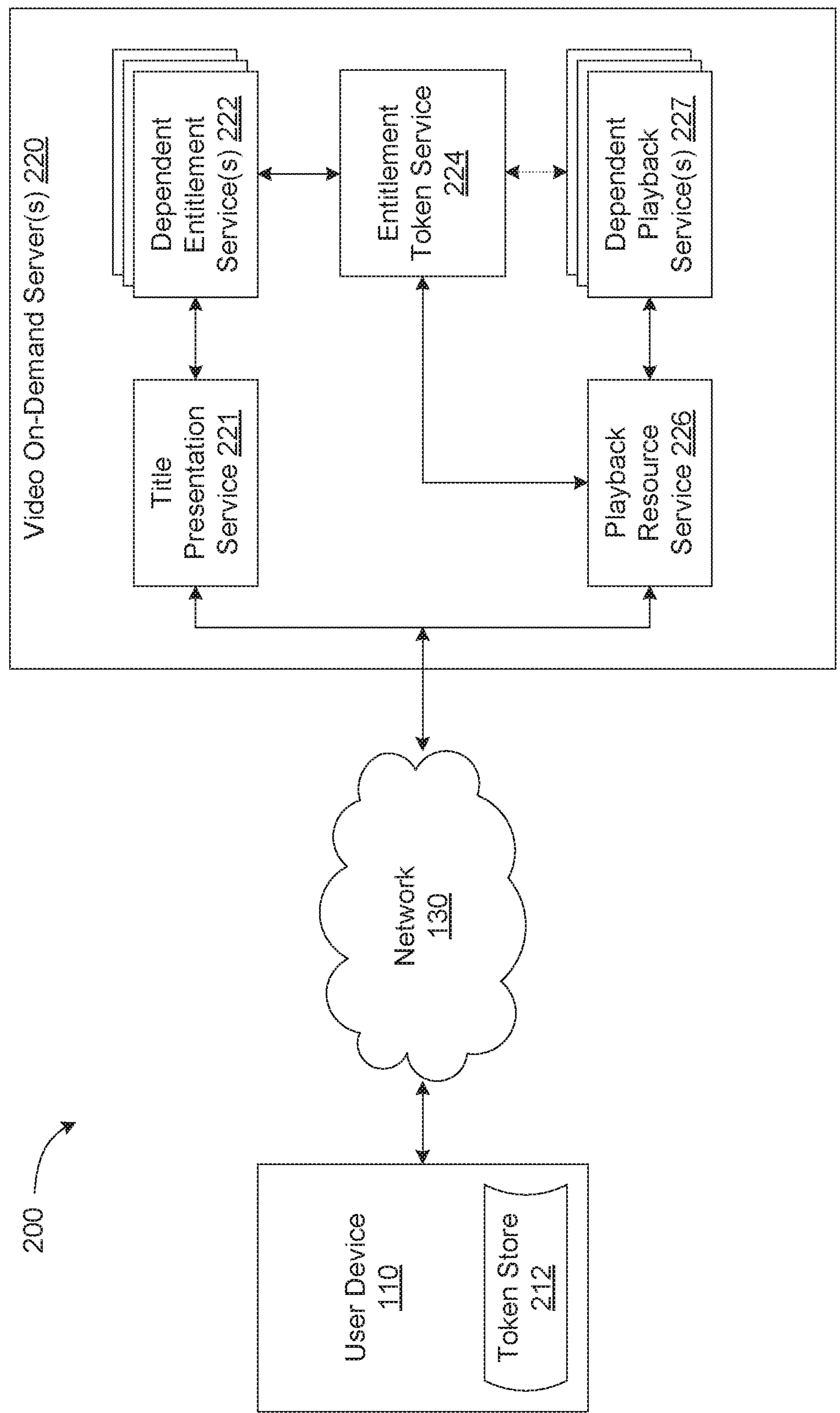
FIG. 2 is a block diagram illustrating a networked environment in which embodiments of the present disclosure may be implemented.

FIG. 2 is a block diagram illustrating a networked environment 200 in which embodiments of the present disclosure may be implemented. The networked environment 200 includes one or more user device 110 and one or more video-on-demand (VOD) servers 220, which are in data communication with each other via network 130. The network 130 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

VOD server 220 may include, for example, a server computer or any other system providing computing capability. Alternatively, server 220 may employ a plurality of computing devices that may be arranged, for example, in one or more server banks or computer banks or other arrangements. Such computing devices may be located in a single installation or may be distributed among many different geographical locations. For example, server 220 may include a plurality of computing devices that together may comprise a hosted computing resource, a grid computing resource and/or any other distributed computing arrangement. In some cases, server 220 may correspond to an elastic computing resource where the allotted capacity of processing, network, storage, or other computing-related resources may vary over time.

Various applications and/or other functionality may be executed by server 220 according to various implementations. Also, various data may be stored in a data store that is accessible to server 220. The data stored in the data store, for example, is associated with the operation of the various applications and/or functional entities described below.

The components executed on server 220, for example, can include a title presentation service 221, one or more dependent entitlement services 222, an entitlement token service 224, a playback resource service 226, one or more dependent playback services 227, and other applications, services, processes, systems, engines, or functionality not discussed in detail herein. In one embodiment, title presentation service 221 may be executed to retrieve and present a plurality of video or media titles which are available for playback on user device 110 through the VOD service. For example, title presentation service 221 may receive a request to browse available titles from user device 110 and may identify those titles which user device 110 is entitled to view. In one embodiment, title presentation service 221 may execute a procedure call to one or more dependent entitlement services 222. These dependent entitlement services 222 may compare identification information received from user device 110 to stored entitlement information and/or policy data to generate an entitlement result. In one embodiment, the entitlement result indicates a plurality of media titles which user device 110 is entitled to request for playback. In one embodiment, one of dependent services 222 is a playback authority service that aggregates decisions made by one or more other dependent entitlement services 222 to generate the entitlement result. Dependent entitlement services 222 may pass the entitlement result to entitlement token service 224.

In one embodiment, entitlement token service 224 may be executed to generate an encrypted entitlement token and send the entitlement token to user device 110. In one embodiment, to generate the entitlement token, entitlement token service 224 packages the entitlement result from dependent entitlement services 222 with an indication of the request to browse available titles from user device 110 and an indication of an associated time-to-live in a transferable data object. The time-to-live may be a value indicating a lifespan of the entitlement token. For example, in one embodiment, the time-to-live may be relatively short (e.g., 10 seconds, 20 seconds, 30 seconds, 60 seconds, etc.). Once the time-to-live expires, the entitlement token is invalid and will not be able to be used to validate entitlement of user device 110 or any other token holder. The time-to-live may be relatively short to help ensure that conditions of the request have not significantly changed between when the token is generated and when the token is redeemed. For example, a certain account associated with user device 110 may have a limit on the number of titles that can be requested concurrently. The account may be under the limit when the entitlement token is generated, and thus the token would indicate that the user device 110 was entitled to request additional titles. With a short time-to-live, it can be assumed that the account has not exceeded the limit before the time-to-live expires. If, however, the time-to-live was much longer (e.g., 1 hour, 24 hours or more) it is much more likely for the account to have exceeded the concurrency limit, thus making the entitlement result in the token out-of-date.

In one embodiment, playback resource service 226 may be executed to initiate playback of a selected video or media title on user device 110 through the VOD service. For example, playback resource service 226 may receive a request to initiate playback of a first title from user device 110. In one embodiment, playback resource service 226 may execute a procedure call to one or more dependent playback services 227. In one embodiment, the request to initiate playback of the media title may include the entitlement token previously sent to user device 110. Playback resource service 226 or one of dependent playback services 227 may provide the entitlement token to entitlement token service 224 for decryption and validation. Entitlement token service 224 may decrypt the entitlement token, verify that the time-to-live value associated with the token has not expired, and validate that the contents of the token indicate that the user device 110 is entitled to initiate playback of the requested media title. Playback resource service 226 thus does not have to make the same procedure calls to the dependent entitlement services 222 which were previously executed by title presentation service 221 to generate the entitlement result. Entitlement token service 224 can provide an indication of whether the token is valid or not to playback resource service 226, which can initiate playback of the requested media title on user device 110 if appropriate.

User device 110 is representative of a plurality of client devices that may be coupled to the network 130. User device 110 comprises, for example, a processor-based system such as a computer system. Such a computer system may be embodied in the form of a desktop computer, a laptop computer, a personal digital assistant, cellular telephone, smartphone, set-top box, music player, web pad, tablet computer system, game console, electronic book reader, or other device with similar capability. In one embodiment, user device 110 includes a web browser or some other application or communication program. These programs may be utilized to access VOD service 120 (e.g., through a web page or mobile application) provided by a supplier, through which requests may be made of the top-level service. For example, a web browser may be used to request to browse media titles available for playback on user device 110 or to request initiate playback of a given media title on user device 110. Requests sent using the web browser may be received and processed by the various services provided by VOD server 220, as will be described in more detail below. In another embodiment, requests of video on-demand service 120 may be made through a stand-alone application running on user device 110 rather than through a web browser. In one embodiment, user device 110 store the entitlement token or tokens received from VOD server 220 in token store 212. Token store 212 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

Figure 3:
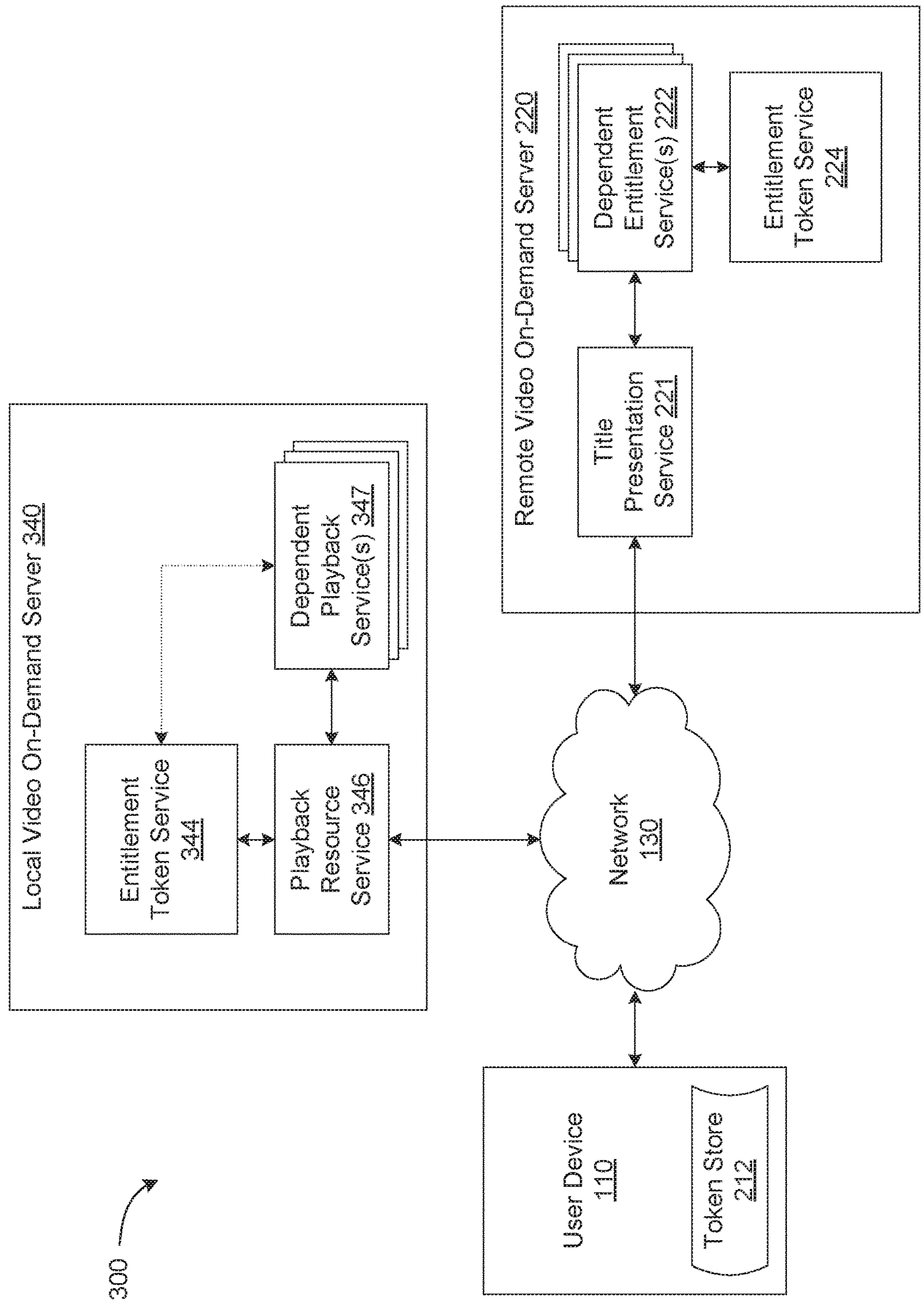
FIG. 3 is a block diagram illustrating a second networked environment in which embodiments of the present disclosure may be implemented.

FIG. 3 is a block diagram illustrating a second networked environment 300 in which embodiments of the present disclosure may be implemented. The networked environment 300 includes one or more user devices 110 remote VOD server 220 and local VOD server 340, which are in data communication with each other via network 130. In one embodiment, the processing operations of a VOD service utilized by user device 110 may be distributed across remote VOD server 220 and local VOD server 340. Remote VOD server 220, for example, may be located at great physical distance from user device 110 (e.g., in a different country or across the continent) and may be designed to serve a relatively large region. Local VOD server 340, however, may be located much closer in physical proximity to user device 110 (e.g., within the same country or state) and may be designed to serve a relatively small region.

In one embodiment, remote VOD server 220 may include title presentation service 221, one or more dependent entitlement services 222, and an instance of entitlement token service 224. In addition, remote VOD server 220 may include other applications, services, processes, systems, engines, or functionality not discussed in detail herein. In one embodiment, remote VOD server 220 may host browsing operations for user device 110. For example, title presentation service 221 may be executed to retrieve and present a plurality of video or media titles which are available for playback on user device 110 through the VOD service. In one embodiment, remote VOD server 220 may be configured to perform entitlement operations by executing dependent entitlement services 222. These dependent entitlement services 222 may compare identification information received from user device 110 to stored entitlement information and/or policy data to generate an entitlement result. Dependent entitlement services 222 may pass the entitlement result to entitlement token service 224. Entitlement token service 224 may be executed to generate an encrypted entitlement token and send the entitlement token to user device 110 over network 130. Since remote VOD server 220 located at a further physical distance from user device 110, there may be some latencies associated with data traversing network 130.

In one embodiment, local VOD server 340 may include playback resource service 346, one or more dependent playback services 347, another instance of entitlement token service 344 and other applications, services, processes, systems, engines, or functionality not discussed in detail herein. In one embodiment, local VOD server 340 may host playback operations for user device 110. For example, playback resource service 226 and dependent playback services 347 may be executed to initiate playback of a selected video or media title on user device 110 through the VOD service. In one embodiment, local VOD server 340 may be not be configured to perform entitlement operations, as the processing resources do not include dependent entitlement services 222. Rather, upon receiving a request to initiate playback of a media title along with a corresponding entitlement token previously sent to user device 110, playback resource service 346 or one of dependent playback services 347 may send the entitlement token to entitlement token service 344 for decryption and validation. Entitlement token service 344 may decrypt the entitlement token, verify that the time-to-live value associated with the token has not expired, and validate that the contents of the token indicate that the user device 110 is entitled to initiate playback of the requested media title. As a result, playback resource service 226 does not have to make procedure calls to the dependent entitlement services 222 on remote VOD server 220. Since local VOD server 340 located at a much smaller physical distance from user device 110, the latencies associated with data traversing network 130 may be much less than when accessing remote VOD server 220.

Figure 4:
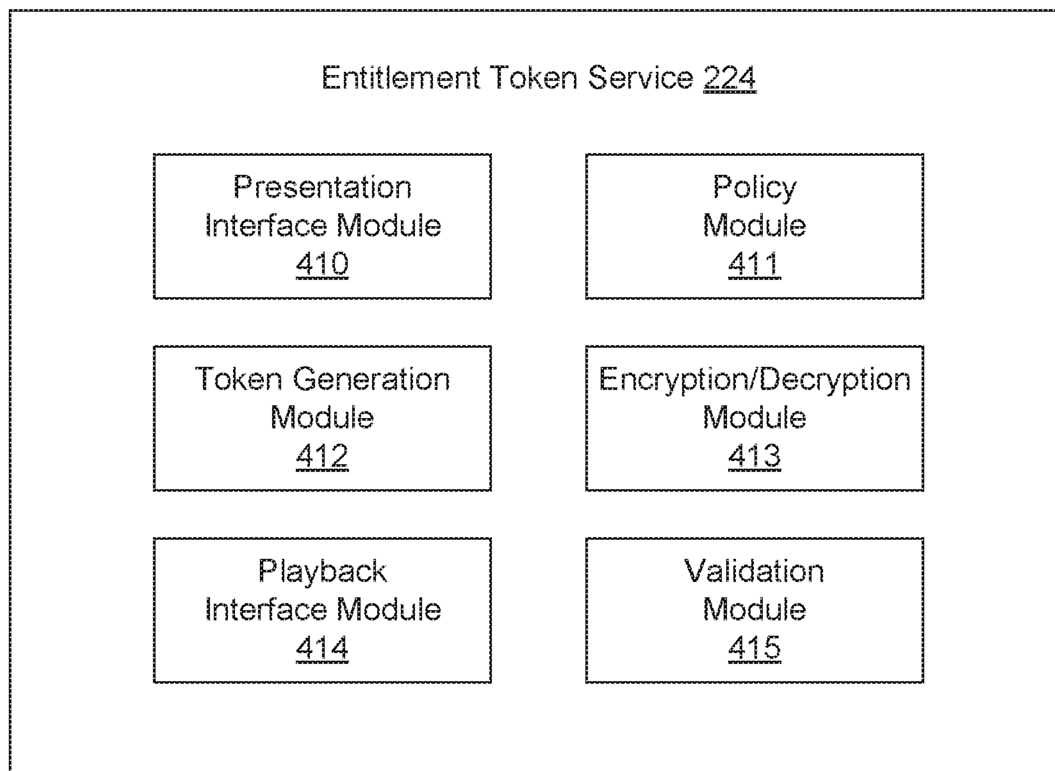
FIG. 4 is a block diagram illustrating an entitlement token service, according to an embodiment.

FIG. 4 is a block diagram illustrating an entitlement token service 224, according to an embodiment. In one embodiment, entitlement token service 224 includes presentation interface module 410, policy module 411, token generation module 412, encryption/decryption module 413, playback interface module 414, and validation module 415. This arrangement of modules and components may be a logical separation, and in other embodiments, these modules or other components can be combined together or separated in further components, according to a particular embodiment.

In one embodiment, presentation interface module 410 is responsible for communication and interaction with title presentation service 221. In one embodiment, presentation interface module 410 may receive an entitlement result from either title presentation service 221 or one of dependent entitlement services 222, along with a request to generate an encrypted entitlement token.

In one embodiment, policy module 411 identifies a set of applicable policies to apply when evaluating a request associated with the entitlement token. In one embodiment, based on the identification information received from user device 110, policy module 411 identifies one or more policies that are applicable. The policies may be based, for example, on a type of the user device, a type of account associated with the user device, a location of the user device, a playback history of the user device, or other factors. Policy module 411 may generate a policy identification (ID) value that can be included in the entitlement token. The policy ID value may map to the set of applicable policies which can be evaluated at the time the token is validated to determine whether the user device is authorized to make a certain request of the VOD service.

In one embodiment, token generation module 412 packages the entitlement result from dependent entitlement services 222 with an indication of the request to browse available titles from user device 110, the policy ID value, an indication of an associated time-to-live, and other data values in a transferable data object. The time-to-live may be a value indicating a lifespan of the entitlement token. Once the time-to-live expires, the entitlement token is invalid and will not be able to be used to validate entitlement of user device 110 or any other token holder. In addition, token generation module 412 may include additional information in the entitlement token such as, for example, start and end times of a playback window, an indication of certain content types that are entitled, an indication of an entitled playback resolution and video quality, etc. Token generation module 412 may transmit the transferable data object to user device 110 for use in making future requests. In another embodiment, token generation module 412 may provide the token to title presentation service 221 for transmission to user device 110.

In one embodiment, encryption/decryption module 413 performs encryption and decryption on the entitlement token generated by token generation module 412. Encryption/decryption module 413 may utilize any of various different encryption schemes, such as symmetric-key encryption or public-key encryption to encode the entitlement token in such a way that only authorized parties can read it. Encrypting the entitlement token prevents user device 110 from providing a counterfeit encryption key in hopes of accessing media content to which it is not actually entitled. When entitlement token service 224 receives the encrypted entitlement key back from user device 110 along with a request to access a media title, encryption/decryption module 413 can also decrypt the entitlement key to verify its authenticity before the entitlement key is validated.

In one embodiment, playback interface module 414 is responsible for communication and interaction with playback resource service 226. In one embodiment, playback interface module 414 may receive an entitlement token from playback resource service 226, along with a request to validate the entitlement token.

In one embodiment, validation module 415 may verify that a time-to-live value associated with the token has not expired, and validate that the contents of the token indicate that the user device 110 is entitled to initiate playback of the requested media title. In one embodiment, validation module 415 evaluates the corresponding policies identified by a policy identifier in the entitlement token. If the token is validated successfully, validation module 415 can notify playback interface module 414 to instruct playback resource service 226 to initiate playback of the requested media title.

Figure 5:
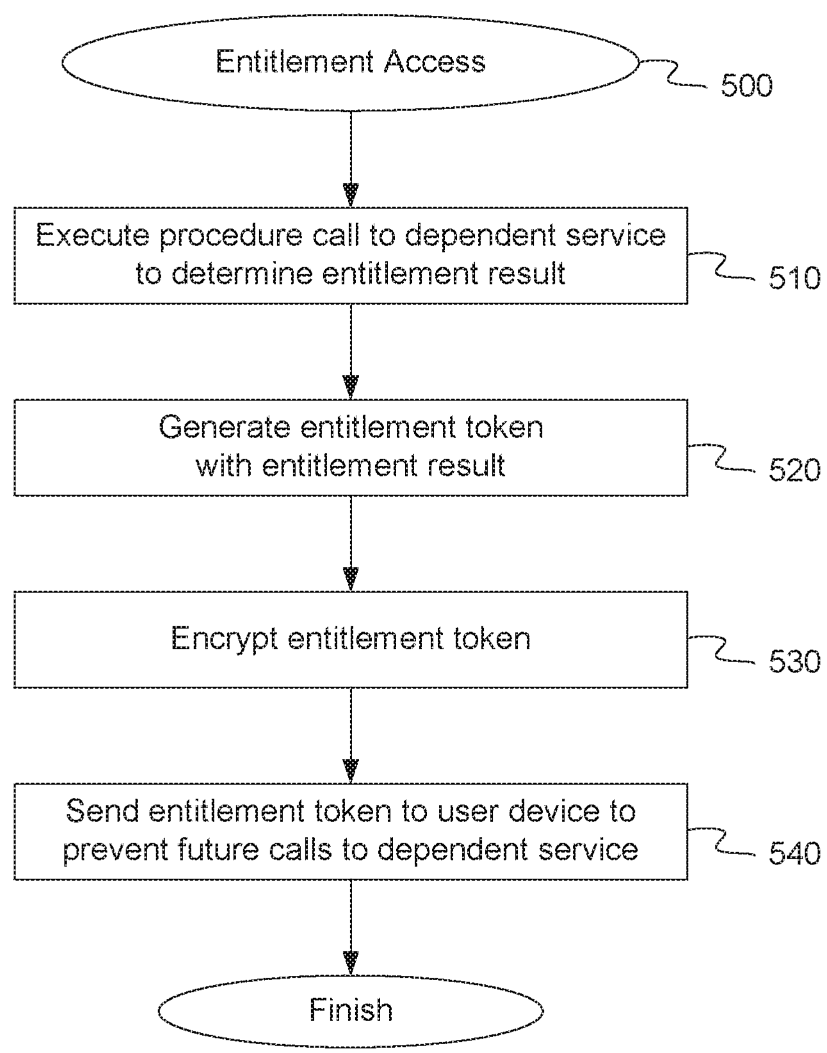
FIG. 5 is a flow diagram illustrating an entitlement access method utilizing a token, according to an embodiment.

FIG. 5 is a flow diagram illustrating an entitlement access method utilizing a token, according to an embodiment. The method 500 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to utilize an entitlement access token to verify entitlement of a requesting user, thereby preventing the need for additional procedure calls to dependent services and decreasing a latency in responding to the request. In one embodiment, method 500 may be performed by VOD server 220, as shown in FIGS. 2-4.

Referring to FIG. 5, at block 510, method 500 executes a procedure call to at least one dependent service to determine an entitlement result for a user device making a first request of a top-level service. In one embodiment, title presentation service 221 may execute the procedure call to one or more dependent entitlement services 222. These dependent entitlement services 222 may compare identification information received from user device 110 to stored entitlement information and/or policy data to generate an entitlement result. In one embodiment, the entitlement result indicates a plurality of media titles which user device 110 is entitled to request for playback. Dependent entitlement services 222 may send the entitlement result to entitlement token service 224.

At block 520, method 500 generates an entitlement token comprising the entitlement result. In one embodiment, token generation module 412 of entitlement token service 224 packages the entitlement result from dependent entitlement services 222 with an indication of the request to browse available titles from user device 110, the policy ID value, an indication of an associated time-to-live, and other data values in a transferable data object. In addition, token generation module 412 may include additional information in the entitlement token such as, for example, start and end times of a playback window, an indication of certain content types that are entitled, an indication of an entitled playback resolution and video quality, etc.

At block 530, method 500 encrypts the entitlement token. In one embodiment, encryption/decryption module 413 performs encryption on the entitlement token generated by token generation module 412. Encryption/decryption module 413 may utilize any of various different encryption schemes, such as symmetric-key encryption or public-key encryption to encode the entitlement token in such a way that only authorized parties can read it.

At block 540, method 500 sends the entitlement token to the user device, the user device to return the entitlement token when making a second request of the top-level service to prevent the top-level service from making additional procedure calls to the at least one dependent service. In one embodiment, token generation module 412 may transmit the transferable data object to user device 110 for use in making future requests. In another embodiment, token generation module 412 may provide the token to title presentation service 221 for transmission to user device 110.

Figure 6:
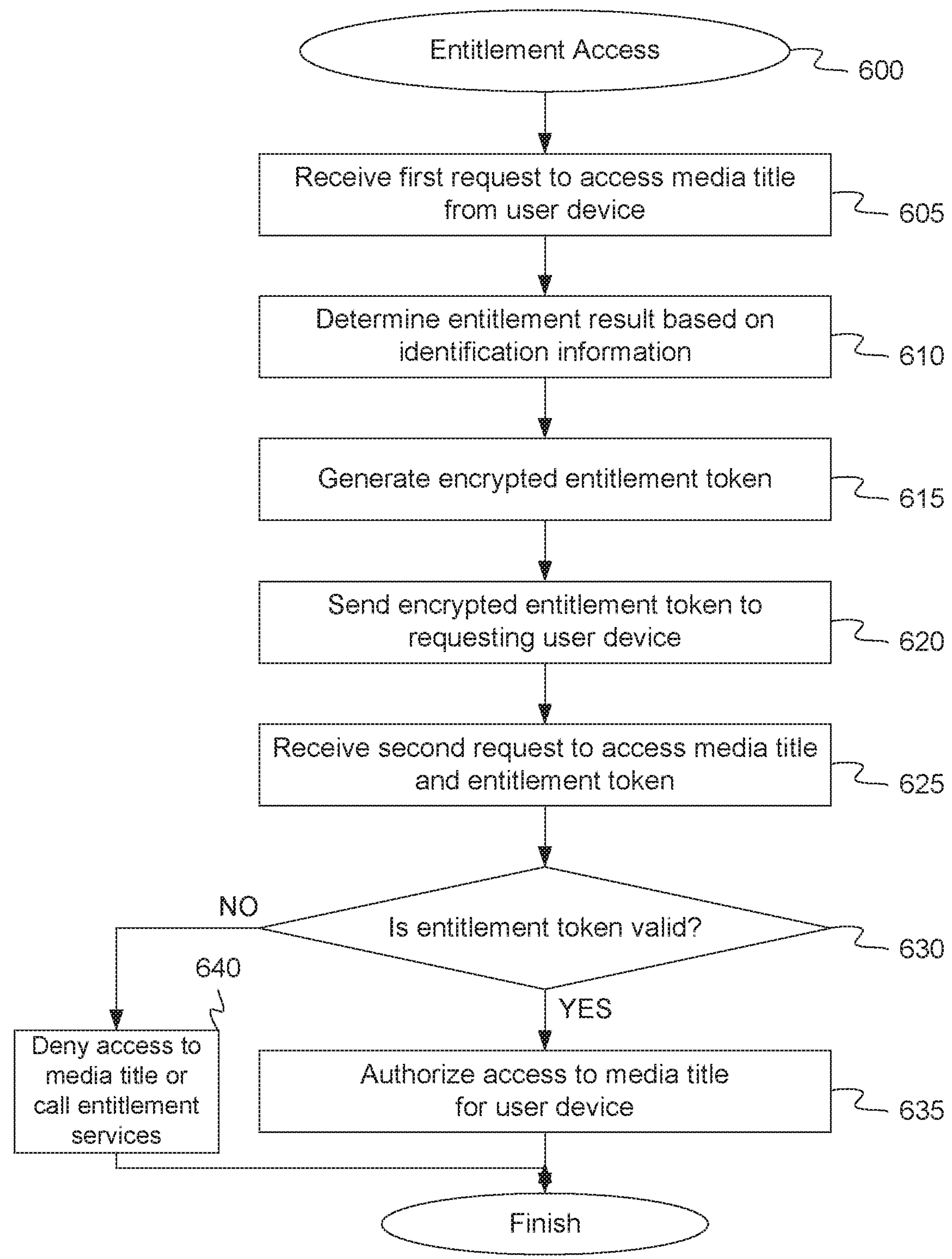
FIG. 6 is a flow diagram illustrating an entitlement access method utilizing a token, according to an embodiment.

FIG. 6 is a flow diagram illustrating an entitlement access method utilizing a token, according to an embodiment. The method 600 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to utilize an entitlement access token to verify entitlement of a requesting user, thereby preventing the need for additional procedure calls to dependent services and decreasing a latency in responding to the request. In one embodiment, method 600 may be performed by VOD server 220, as shown in FIGS. 2-4.

Referring to FIG. 6, at block 605, method 600 receives a first request from a user device to access a media title, the request comprising identification information associated with the user device. In one embodiment, title presentation service 221 may receive a request to browse available titles from user device 110 and may identify those titles which user device 110 is entitled to view.

At block 610, method 600 determines an entitlement result based on the identification information, the entitlement result indicating that the user device is entitled to access the media title. In one embodiment, title presentation service 221 may execute a procedure call to one or more dependent entitlement services 222. These dependent entitlement services 222 may compare identification information received from user device 110 to stored entitlement information and/or policy data to generate an entitlement result. In one embodiment, dependent entitlement services 222 may verify whether a particular user, user account, or user device is authorized to view the requested media title, what playback quality is authorized (e.g., high definition, standard definition), whether playback is authorized at a particular location or IP address. The results of these determinations may be included in the entitlement result and ultimately the entitlement token. Dependent entitlement services 222 may send the entitlement result to entitlement token service 224.

At block 615, method 600 generates an encrypted entitlement token comprising the entitlement result. In one embodiment, token generation module 412 of entitlement token service 224 packages the entitlement result from dependent entitlement services 222 with an indication of the request to browse available titles from user device 110, the policy ID value, an indication of an associated time-to-live, and other data values in a transferable data object. In addition, token generation module 412 may include additional information in the entitlement token such as, for example, start and end times of a playback window, an indication of certain content types that are entitled, an indication of an entitled playback resolution and video quality, etc. At block 620, method 600 sends the encrypted entitlement token to the user device. In one embodiment, token generation module 412 may transmit the transferable data object to user device 110 for use in making future requests.

At block 625, method 600 receives a second request from the user device to access the media title, the request comprising the encrypted entitlement token. In one embodiment, playback resource service 226 may receive a request to initiate playback of a first title from user device 110. In one embodiment, playback resource service 226 may execute a procedure call to one or more dependent playback services 227. In one embodiment, the request to initiate playback of the media title may include the entitlement token previously sent to user device 110. Playback resource service 226 may send the entitlement token to entitlement token service 224 for decryption and validation.

At block 630, method 600 determines whether the received entitlement token is valid. Entitlement token service 224 may decrypt the entitlement token, verify that the time-to-live value associated with the token has not expired, and validate that the contents of the token indicate that the user device 110 is entitled to initiate playback of the requested media title. Entitlement token service 224 can provide an indication of whether the token is valid or not to playback resource service 226, which can initiate playback of the requested media title on user device 110 if appropriate. If the entitlement token is valid, at block 635, method 600 authorizes access to the media title for the user device. If the entitlement token is not valid, at block 640, method 600 denies access to the media title for the user device. In another embodiment, at block 640, method 600 may determine an entitlement result in the manner described above at block 610. For example, entitlement token service 224 may execute a procedure call to one or more dependent entitlement services 222. These dependent entitlement services 222 may compare identification information received from user device 110 to stored entitlement information and/or policy data to generate the entitlement result.

Figure 7:
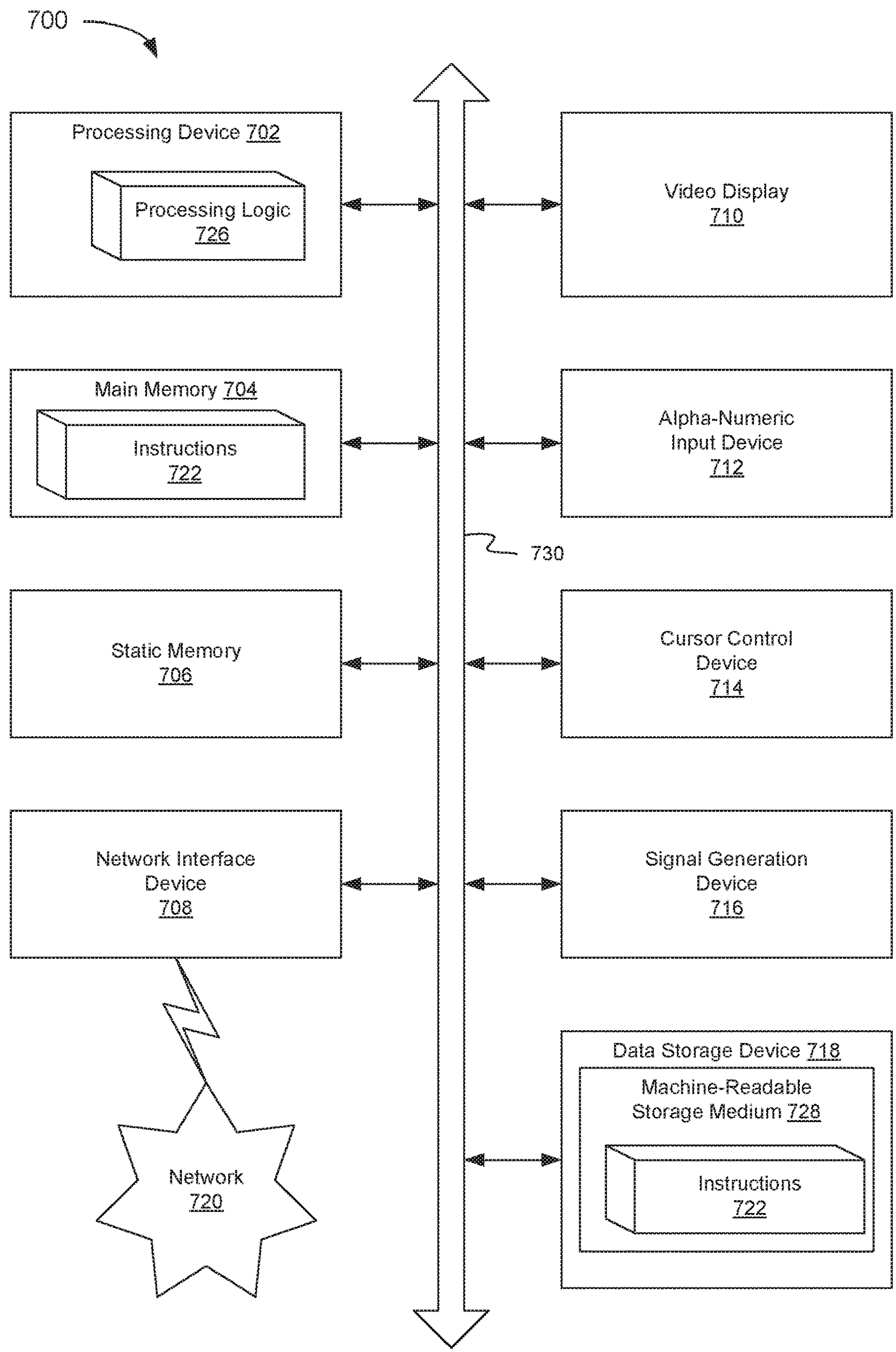
FIG. 7 is a block diagram illustrating an exemplary computer system, according to an embodiment.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may represent user device 110 or one of servers 220 and/or 340 of FIGS. 1-3.

The exemplary computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions 722 (e.g., instructions of entitlement token service 224/334) embodying any one or more of the methodologies or functions described herein. The instructions 722 may also reside, completely or at least partially, within the main memory 704 and/or within processing logic 726 of the processing device 702 during execution thereof by the computer system 700, the main memory 704 and the processing device 702 also constituting computer-readable media. The instructions may further be transmitted or received over a network 720 via the network interface device 708.

While the computer-readable storage medium 728 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as “determining”, “identifying”, “adding”, “selecting” or the like, refer to the actions and processes of a computer system, or similar electronic computing device, that manipulates and transforms data represented as physical (e.g., electronic) quantities within the computer system’s registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

receiving, by a server, a request from a user device to browse video titles available for playback on the user device through an on-line video on demand service, the request comprising identification information associated with the user device;

executing a procedure call to at least one dependent service, the dependent service to compare the identification information to entitlement information to generate an entitlement result, the entitlement result to indicate a plurality of video titles which the user device is entitled to request for playback;

generating, by a processing device, an encrypted entitlement token comprising the entitlement result, an indication of the request to browse video titles, and a policy identifier indicating one or more policies to be applied when evaluating a request associated with the encrypted entitlement token;

sending the encrypted entitlement token to the user device;

receiving, by the server, a request from the user device to initiate at least one of downloading or streaming of a first video title of the plurality of video titles, the request comprising the encrypted entitlement token comprising the entitlement result indicating the plurality of video titles which the user device is entitled to request for playback;

validating the encrypted entitlement token by applying the one or more policies indicated by the policy identifier, wherein the encrypted entitlement token prevents the server from making additional procedure calls to the at least one dependent service which generated the entitlement result indicating the plurality of video titles which the user device is entitled to request for playback; and authorizing the at least one of downloading or streaming of the first video title on the user device.

2. The method of claim 1, wherein the entitlement result is based on at least one of a type of the user device, a type of account associated with the user device, a location of the user device, or a playback history of the user device.

3. The method of claim 1, wherein the encrypted entitlement token has an associated time-to-live, wherein the encrypted entitlement token is invalid after the associated time-to-live expires.

4. A system comprising:

a memory; and a processing device operatively coupled to the memory, the processing device to:

execute a procedure call to at least one dependent service to determine an entitlement result for a user device making a first request of a top-level service to at least one of download or stream a media title of the top-level service, the entitlement result indicating that the user device is authorized to at least one of download or stream the media title of the top-level service;

generate an entitlement token comprising the entitlement result, an indication of the first request of the top-level service, and a policy identifier indicating one or more policies to be applied when evaluating a request associated with the entitlement token;

encrypt the entitlement token; and send the entitlement token to the user device, the user device to return the entitlement token comprising the entitlement result indicating that the user device is authorized to at least one of download or stream the media title of the top-level service when making a second request of the top-level service, the entitlement token to prevent the top-level service from making additional procedure calls to the at least one dependent service which determined the entitlement result indicating that the user device is authorized to at least one of download or stream the media title of the top-level service.

5. The system of claim 4, wherein the at least one dependent service comprises an entitlement service, the entitlement service to determine whether the user device is authorized to make the first request of the top-level service.

6. The system of claim 4, wherein the top-level service to execute the procedure call to the at least one dependent service in response to receiving the first request from the user device.

7. The system of claim 4, wherein to generate the entitlement token, the processing device to package the entitlement result with the indication of the first request and an associated time-to-live in a transferable data object.

8. The system of claim 7, wherein the entitlement token is invalid after the associated time-to-live expires.

9. The system of claim 4, wherein the processing device further to:

receive the second request of the top-level service from the user device, the second request comprising the entitlement token; and determine whether the user device is authorized to make the second request of the top-level service using the entitlement token and without making additional procedure calls to the at least one dependent service.

10. The system of claim 9, wherein the processing device further to:

decrypt and validate the entitlement token by applying the one or more policies indicated by the policy identifier responsive to receiving the second request from the user device.

11. The system of claim 10, further comprising a remote server comprising a second processing device, the second processing device to:

receive the second request of the top-level service from the user device, the second request comprising the entitlement token; and determine whether the user device is authorized to make the second request of the top-level service using the entitlement token and without making additional procedure calls to the at least one dependent service.

12. A method comprising:

receiving, by a server, a first request from a user device to access a media title, the request comprising identification information associated with the user device;

executing a procedure call to at least one dependent service, the dependent service to compare the identification information to entitlement information to determine an entitlement result based on the identification information, the entitlement result indicating that the user device is entitled to access the media title;

generating, by a processing device, an encrypted entitlement token comprising the entitlement result, an indication of the first request to access a media title, and a policy identifier indicating one or more policies to be applied when evaluating a request associated with the encrypted entitlement token;

sending the encrypted entitlement token to the user device;

receiving, by the server, a second request from the user device to at least one of download or stream the media title, the request comprising the encrypted entitlement token comprising the entitlement result indicating that the user device is entitled to access the media title; and authorizing access to the media title for the user device based on the entitlement token to prevent the server from making additional calls to the dependent service which determined the entitlement result indicating that the user device is entitled to access the media title.

13. The method of claim 12, wherein the entitlement result is based on at least one of a type of the user device, a type of account associated with the user device, a location of the user device, or a playback history of the user device.

14. The method of claim 12, wherein the encrypted entitlement token has an associated time-to-live, wherein the encrypted entitlement token is invalid after the associated time-to-live expires.

15. The method of claim 12, further comprising:

responsive to receiving the second request, validating the encrypted entitlement token sent by the user device by applying the one or more policies indicated by the policy identifier.

* * * * *